United States Patent
Mogre et al.

(10) Patent No.: US 8,462,274 B2
(45) Date of Patent: Jun. 11, 2013

(54) SYSTEMS AND METHODS FOR MITIGATING VISIBLE ENVELOPE EFFECTS

(75) Inventors: Advait Madhav Mogre, Sunnyvale, CA (US); Darren Neuman, Palo Alto, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 31 days.

(21) Appl. No.: 13/115,483

(22) Filed: May 25, 2011

(65) Prior Publication Data

US 2012/0300128 A1    Nov. 29, 2012

(51) Int. Cl.
 *H04N 5/21*  (2006.01)
 *H04N 5/202* (2006.01)
 *G06K 9/40*  (2006.01)

(52) U.S. Cl.
 USPC ............ 348/607; 348/674; 382/275

(58) Field of Classification Search
 USPC ......... 348/607, 618, 622, 674, 687; 382/260, 382/274, 275; 345/611
 See application file for complete search history.

(56) References Cited

U.S. PATENT DOCUMENTS

| | | | | |
|---|---|---|---|---|
| 5,177,613 A * | 1/1993 | Rumreich | | 348/738 |
| 5,534,948 A * | 7/1996 | Baldwin | | 348/675 |
| 6,201,582 B1 * | 3/2001 | Hentschel | | 348/607 |
| 6,246,827 B1 * | 6/2001 | Strolle et al. | | 386/328 |
| 7,120,272 B2 * | 10/2006 | Guiguizian | | 382/100 |
| 7,729,551 B2 * | 6/2010 | Jones | | 382/240 |
| 7,969,456 B2 * | 6/2011 | Brown Elliott et al. | | 345/694 |
| 2003/0088412 A1 * | 5/2003 | Shetty et al. | | 704/243 |
| 2004/0141759 A1 * | 7/2004 | Stiscia et al. | | 398/168 |
| 2007/0097334 A1 * | 5/2007 | Damera-Venkata et al. | ... | 353/94 |
| 2008/0240583 A1 * | 10/2008 | Jones | | 382/232 |

* cited by examiner

*Primary Examiner* — Victor Kostak
(74) *Attorney, Agent, or Firm* — Sterne, Kessler, Goldstein & Fox PLLC (57) ABSTRACT

Systems and methods in accordance with embodiments of the present invention are provided to compensate for the "envelope effect" that appears to an end user as a result of the sampling and digital processing of near-Nyquist frequency components of a video information signal. Embodiments of the present invention improve image quality by effectively nullifying gamma correction in areas where the envelope effect exists, enabling the human eye to perceive the displayed signal without the envelope effect.

20 Claims, 8 Drawing Sheets

SYSTEMS AND METHODS FOR MITIGATING VISIBLE ENVELOPE EFFECTS

FIELD OF THE INVENTION

This invention relates to digital signal processing and more specifically to image correction techniques.

BACKGROUND OF THE INVENTION

In signal processing, aliasing refers to a signal distortion effect that causes different signals to be indistinguishable ("aliases") when sampled. If the sampling frequency of a signal is not sufficiently high, a signal will not be perfectly reconstructed, and artifacts (errors) may occur when the signal is interpolated from the samples taken.

According to the Nyquist-Shannon Theorem, a signal can be perfectly reconstructed from a sampled version of the signal if the sampling rate is greater than two times the bandwidth of a bandlimited signal being sampled—or, in other words, when the Nyquist frequency (half the sampling rate) is greater than the highest frequency of the signal being sampled. However, in practice, perfect reconstruction of signals from these samples is unattainable because filters do not operate ideally, and some amount of aliasing is often unavoidable.

Further, it is not always possible to increase the sampling rate (for example, due to certain standards in an industry) to account for higher frequencies in an information signal. If one or more frequencies in an information signal are above the Nyquist frequency, these frequencies may disturb the information content during sampling. Frequencies above the Nyquist frequency are not interpreted properly and cause interference, which causes the output signal to appear to an end user (e.g., on a screen) as an aliased signal.

Additionally, even if all frequencies in an information signal are below the Nyquist frequency, the envelope around a sampled signal may not be perfectly representative of the actual signal. For example, if a sampling frequency is slightly more than the Nyquist frequency, the envelope around the sampled signal can appear (e.g., to an end user) to be modulated, even though no modulation is applied to the signal. This effect may be referred to as "envelope modulation" or the "envelope effect."

This envelope effect can be especially pronounced when test patterns, which are designed to introduce stress into a display system, are used. Test pattern frequencies often approach half the sampling rate and may even exceed half the sampling rate in some instances, in order to evaluate the display under test.

Accordingly, what is needed are systems and methods to compensate for this "envelope effect" and improve overall image quality.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Systems and methods in accordance with embodiments of the present invention are provided to compensate for the "envelope effect" that appears to an end-user as a "modulation" of near-Nyquist frequency regions of an information signal. The envelope effect may be caused, for example, by near-Nyquist sampling, scaler aliasing, gamma (e.g., the gamma display coefficient of a user's display device), or sharpening. Further, the gamma adjustment of an image by the end-user display causes this envelope effect to be significantly magnified. Embodiments of the present invention improve image quality by effectively nullifying the effect of an applied gamma display coefficient in areas of a signal where the envelope effect exists, enabling the human eye to perceive the displayed signal without the envelope effect.

1. Envelope Effect and Gamma

Because of certain standards for sampling rates that exist in the telecommunications industry, it is not always possible to increase the sampling rate to account for higher frequencies in an information signal. Thus, the maximum allowed sampling rate may be too low to account for these higher frequency components, and aliasing effects may be observed as a result. This can often occur during display evaluation, where manufactures utilize test patterns having frequency content that intentionally stresses the display circuits.

Further, even if all frequencies in an information signal are below the Nyquist frequency, the envelope around a sampled signal may not be perfectly representative of the actual signal. For example, if a sampling frequency is slightly more than the Nyquist frequency, the envelope around the sampled signal can appear (e.g., to an end user) to be "modulated," even though no modulation is applied to the signal.

Near-Nyquist multiburst patterns often have low-frequency artifacts. These artifacts can be visible in the source material (native resolution) or after scaling. Frequencies in excess of half the sampling are "folded into" the signal as interference (in other words, the content at these higher [post-Nyquist] frequencies is frequency translated and added to content at lower sub-Nyquist frequencies), giving the appearance of a "beat" pattern. This effect may also be referred to as "envelope modulation" or the "envelope effect", even though there is no actual modulation applied to the signal.

Figure 1A:
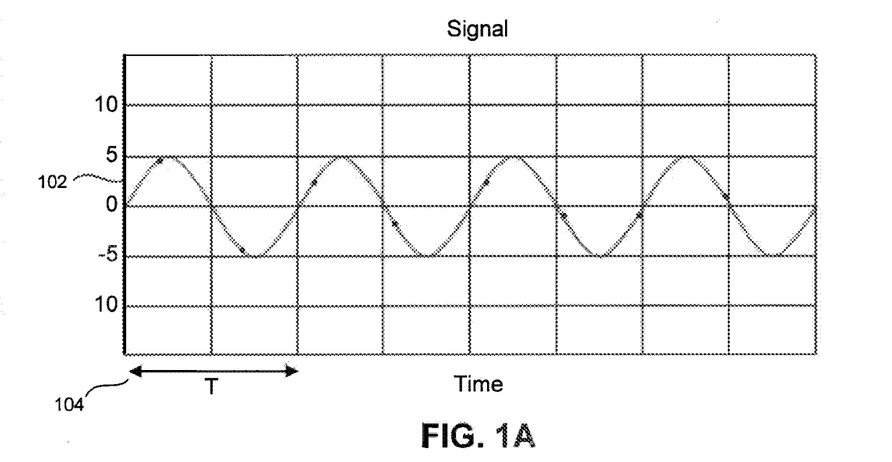
FIG. 1A is a diagram of a sampled signal.
Figure 1B:
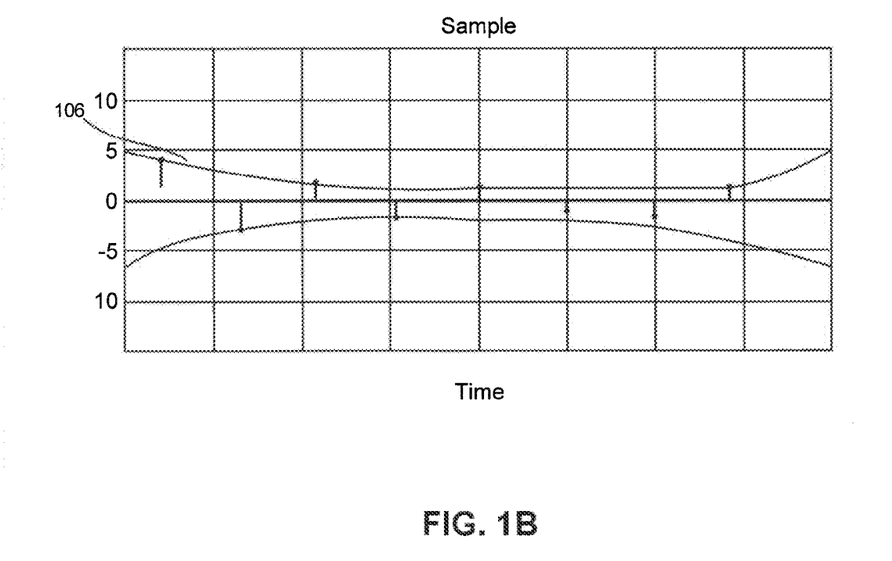
FIG. 1B is a diagram illustrating the envelope effect from samples taken at a sampling rate slightly higher than the Nyquist rate.

FIGS. 1A and 1B illustrate this envelope effect. FIG. 1A is a diagram of a sampled signal. In FIG. 1A, signal 102 is a sine wave with period (T) 104. Signal 102 is shown with dots representing samples of signal 102 taken at a sampling rate slightly higher than the Nyquist rate.

FIG. 1B shows the samples taken from signal 102. In FIG. 1B, envelope 106 is drawn around the samples. Even though signal 102 was sampled correctly according to the Nyquist-Shannon Theorem, envelope 106 is not perfectly representative of signal 102 and appears compressed or modulated, even though no modulation is applied to the signal. When the samples of signal 102 are transmitted to an end user, the user perceives artifacts and/or modulation in the displayed signal.

As shown in FIG. 1B, this perception is caused by the relative movement of sample points, taken from an input signal, from one period to the next. As data representative of the samples is transmitted to the user, the user perceives the envelope around the data stream, which may appear "modulated" to the user. This perceived envelope effect can effectively be "averaged out" by the human eye as the signal is transmitted, but it becomes more significant when display coefficients, such as a gamma display coefficient, are introduced. Such display coefficients can cause a nonlinear effect on the transmitted signal and can accentuate the envelope effect as seen by the end user.

For example, the envelope effect caused by near-Nyquist sampling is further magnified by gamma in image and/or video processing. "Gamma" refers to an operation used in image and video processing to code and decode linear luminance and/or RGB values into image and/or video signals. Each display device has a certain gamma value (i.e., a gamma display coefficient) that distorts a displayed image, and image signals are pre-corrected to account for the gamma display coefficient so as display the image more accurately. Images or videos that are not properly gamma adjusted appear to an end user as too dark or too light. Gamma adjustment may be defined by the expression $V_{OUT}=V_{IN}^{\gamma}$.

Due to gamma adjustment, the signal that appears to an end user on a screen often has a DC shift. If the gamma exponent value is set at one, the human eye typically averages out the envelope effect and does not perceive (from a distance) the displayed signal as a modulated signal. However, if the gamma exponent value is not one, this DC shift creates a nonlinear effect and gives the displayed signal a modulated appearance. Thus, gamma adjustment accentuates the envelope effect of sub-Nyquist sampling.

Picture Quality/enhancement processes like sharpening and scaling can either accentuate (as in sharpening or down-scaling) or mitigate (as in up-scaling), the envelope effect in periodic (near Nyquist) regions of a given image. However, disabling sharpening or choosing appropriate scaler filter coefficients to avoid aliasing is not sufficient to prevent all envelope effects, especially those that naturally occur due to near Nyquist sampling of periodic video content that is maintained at native resolution.

2. Systems

Envelope effect correction systems, apparatuses, and/or modules in accordance with embodiments of the present invention may be incorporated into signal processing hardware and/or software to compensate for the envelope effect of sub-Nyquist sampling and reduce the appearance of modulation of the displayed signal to an end user. For example, these envelope effect correction systems, apparatuses, and/or modules may be incorporated into video and image processing systems (for example, on the same chip used to process the video or image signals).

Figure 2A:
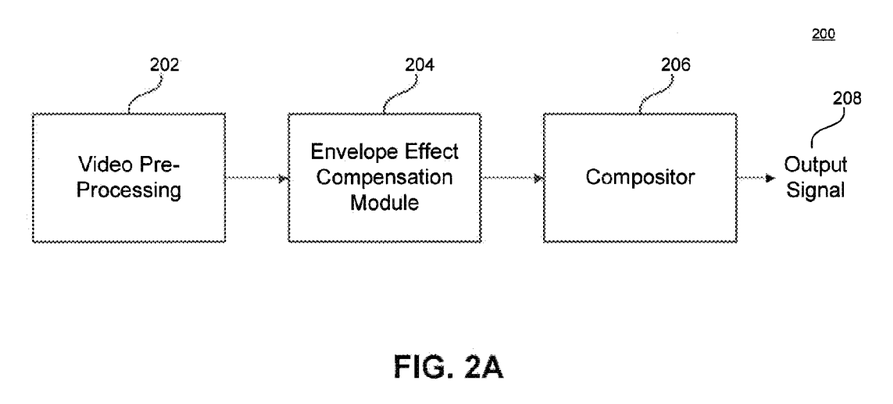
FIG. 2A is a block diagram 200 of an embodiment of the present invention showing an envelope effect compensation module incorporated onto a video processing chip.

FIG. 2A is a block diagram 200 of an embodiment of the present invention showing an envelope effect compensation module incorporated with a video processing chip. In FIG. 2A, video pre-processing module 202 pre-processes a video signal for a display controller. For example, video pre-processing module 202 may be responsible for scaling functions, noise reduction, etc. Envelope effect compensation module 204 is used to correct the envelope effect in the pre-processed video signal from video pre-processing module 202. The corrected signal may then be passed to compositor module 206, which combines the video signal with any compensation graphics to be superimposed on the video before the signal is output 208 to the end user's display.

Figure 2B:
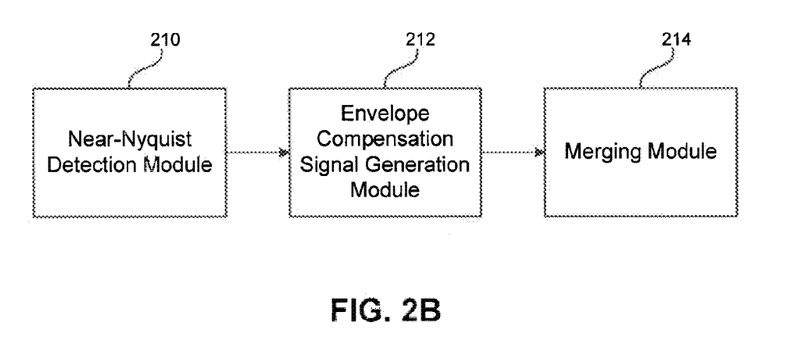
FIG. 2B is a block diagram of an embodiment of envelope effect compensation module 204.

FIG. 2B is a block diagram of an embodiment of envelope effect compensation module 204. In FIG. 2B, near-Nyquist module 210 detects near-Nyquist frequency components of a periodic signal. Envelope compensation signal generation module 212 generates an error or compensation signal from the envelope profile to compensate for the regional envelope effect (effectively nullifying gamma adjustment in the areas where the envelope effect exists). Merging module 214 then merges the error profile with the detected envelope region in an effective manner to mitigate the envelope effect.

As discussed above, gamma adjustment magnifies the envelope effect caused by sub-Nyquist sampling. After the gamma adjustment is nullified in regions where the envelope effect exists, the human eye is able to effectively "average out" the gamma effect on the displayed signal, and the displayed signal no longer appears modulated to a human end user. Accordingly, embodiments of the invention advantageously compensate the portions of the signal that are near the Nyquist frequency without negatively impacting the portions of the signal that are not near-Nyquist (which typically do not cause a substantial envelope effect).

Figure 3:
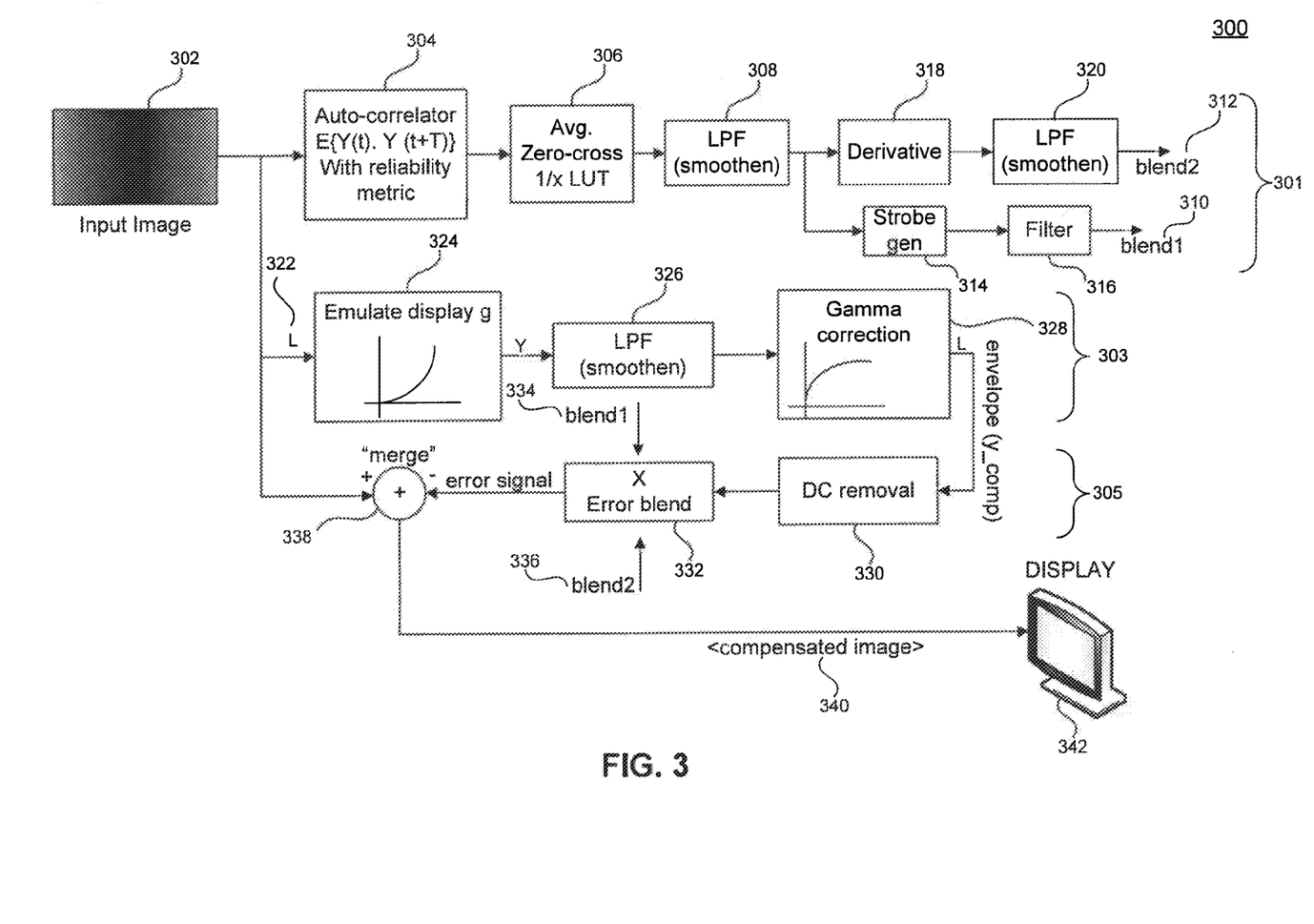
FIG. 3 is a block diagram 300 of an envelope effect compensation module in accordance with an embodiment of the present invention.

FIG. 3 is a block diagram 300 of an exemplary envelope effect compensation module 204 in accordance with an embodiment of the present invention. The envelope effect compensation module of FIG. 3 is configured to receive an input (represented by input image 302, which may be a static image or video data) on a line by line basis, emulate the effect of the end user's gamma display coefficient on the input (for example, in commercial systems, the gamma display coefficient is typically 2.0 or 2.2), detect near-Nyquist components of the input (i.e., those frequency components of the signal that are within a pre-defined range of the Nyquist frequency), extract the envelope causing these near-Nyquist frequency components, and perform a gamma transform function on the extracted envelope to nullify the effect of the gamma display coefficient on these near-Nyquist frequency regions of the input signal. Nullifying the effect of the gamma display coefficient on the near-Nyquist frequency regions advantageously compensates for the pronounced envelope effect caused by the nonlinear impact of the gamma display coefficient on the near-Nyquist frequency components of the input signal without negatively impacting other portions of the signal, where the envelope effect does not have a significant impact on the quality of the input signal.

In FIG. 3, input image 302 is processed on a line by line basis to prevent spillover effects. For example, if horizontal lines of input image 302 are processed one at a time, bleeding effects from the vertical direction are prevented. However, it should be noted that embodiments of the present invention may process lines of input image 302 in either (or both) the horizontal direction and/or the vertical direction.

FIG. 3 is shown as having three signal paths (301, 303, and 305) of operations. The operations of the first path 301 are used to detect whether the input signal is periodic and to detect whether frequency components of the input signal are near the Nyquist frequency (½ the sampling rate). This information is used to generate compensation signals for identifying areas of the input signal where gamma adjustment should be nullified to alleviate the envelope effect. The operations of the second row 303 emulate the gamma display coefficient of the end user's display device, extract the envelope using a low pass filter, and generate a signal to nullify the effect of gamma adjustment. The operations of the third row 305 DC compensate the envelope compensation signal, weight the compensation signals generated by the second row 303 using frequency information detected by the first path 301, and merge weighted compensation signals with the original input signal.

The first path 301 of operations will now be explained in greater detail. First, input image 302 is passed (on a line by line basis) to auto-correlator 304, which takes a snapshot of the image signal and correlates samples of the image signal. Auto-correlator 304 determines whether the image signal is periodic by moving a correlation window at the beginning of the line to the end of the line on a pixel by pixel. Module 306 determines the period of the signal by averaging the time between zero crossings in the signal for each iteration of window movement, and the frequency of the signal is estimated using the zero crossing data by inverting the average period.

After the frequency estimate is smoothed by low pass filter 308 (e.g., in an embodiment, a 2-tap infinite impulse response ("IIR") filter), it is then used to generate two weighting "blend" signals: blend1 signal 310 and blend2 signal 312. Blend1 signal 310 indicates if a given pixel is part of a valid periodic pattern that is close to the Nyquist frequency, and is used to merge in the envelope compensation at regions of the signal where a valid envelope has been detected. However, it may be desirable to avoid compensating the envelope in regions where the input frequency variation is high. Blend2 represents the first derivative, or change, in the envelope frequency detected by 306 and 308. Blend2 signal 312 is used to merge out envelope compensation at regions of the signal where there is a rapid change in frequency.

The generation of blend1 signal 310 in accordance with an embodiment of the present invention will now be explained. In an embodiment, strobe generation module 314 slices the frequency output to high ("1") or low ("0") based on the frequency estimate. These "high" areas are used to identify portions of the input signals where envelope effect compensation should be applied (i.e., those areas of the input signal having near-Nyquist frequency components). Strobe generation module 314 may also optionally force any "narrow" regions (i.e., regions lower than a predetermined width) low and may shape (narrow) the surviving high region to avoid fringe effects, which may be especially relevant to patterns that have sharply defined or discrete frequency regions. The output is then smoothed by filter 316 to yield blend1 signal 310. The generation of blend1 signal 310 is further explained herein with reference to FIGS. 7A and 7B.

As discussed above, the blend2 signal 312 is used to blend out the envelope compensation or error signal at the input line region where frequency variation of the envelope signal is significant (i.e., where the derivative is high). Derivative computation module 318 estimates the first order derivative using a window-based approach to indicate frequency variation. Filter 320 filters (smooths) the derivative to generate blend2 signal 312. In an embodiment, a user-programmed value may be used to clamp the filtered derivative output to a predefined range. The generation of blend2 signal 312 is further explained later with reference to FIG. 8. As discussed above, and as explained in further detail below, blend1 signal 310 and blend2 signal 312 are used later as weighting signals to identify portions of the input image where envelope effect compensation should be applied.

The operations of the second signal path 303 of FIG. 3 will now be explained. As previously discussed, the operations of the second path emulate the gamma display coefficient of the end user's display device, extract the envelope using a low pass filter, and generate a compensation signal to nullify the effect of gamma adjustment.

First, each line 322 of input image 302 is input to emulation module 324, which is configured to emulate the effect of the end user's gamma display coefficient on the input image signal. In an embodiment, the gamma display coefficient for a particular display is a known quantity (for example, 2.0 or 2.2). As discussed above, gamma adjustment may be applied to a signal according to the expression $V_{OUT}=V_{IN}^{\gamma}$. Thus, emulation module 324 effectively applies, as an exponent, a known display gamma value to line 322 of input image 302 to emulate line 322 as it would appear on the end user's display device. Low pass filter 326 is then used to smooth the output of emulation module 324, so as to extract any image envelope caused by near-Nyquist frequencies and the gamma effect.

In an embodiment, low pass filter 326 is a 5-tap smoothening finite impulse response ("FIR") filter with a zero at the Nyquist frequency. In an embodiment, low pass filter 326 has unity gain at DC and a monotonically decreasing gain as the frequency increases, culminating with a zero at the Nyquist frequency. This results in minimal attenuation of slowly varying envelopes arising from the gamma processing and an increasing attenuation of those envelopes approaching the Nyquist frequency. The phase variation with frequency should be as gradual as possible (i.e. the constant linear phase slope should be small). For example, the class of FIRs defined by $(1+Z)^n$, where "n" is an integer, satisfy the above criteria.

The output of low pass filter 326 is passed to envelope gamma correction module 328. Envelope gamma correction module 328 effectively raises the exponent of the extracted envelope signal to the inverse of gamma (i.e., the existing gamma exponent of the extracted envelope signal is multiplied by the inverse of gamma), thereby nullifying the gamma exponent emulated by emulation module 324. In other words, gamma correction module 328 essentially nullifies the gamma adjustment in the extracted envelope of the image signal 302. By doing so, gamma correction module 328 creates a signal that may be used to selectively nullify the effect of the end user's gamma display coefficient from portions of line 322 of image signal 302. As stated above, this evaluation and nullification of the gamma effect is done on a line-by-line basis of the input image 302.

The operations of the third signal path 305 of FIG. 3 will now be explained. As previously discussed, the operations of the third row 305 DC compensate the envelope compensation signal, weight the compensation signals generated by the second row 303 using frequency information detected by the first path 301, and merge weighted compensation signals with the original input signal. Specifically, the error blend module 332 weights the envelope compensation error signal using the blend1 signal 310 and blend2 signal 312, so that the envelope compensation error signal is only applied to those portions of the input image 302/322 that demonstrate near-Nyquist frequency effects. The merge module 338 then merges the envelope compensation error signal after weighting with the original input line 322 to effect the envelope correction and produce the compensated image 340.

Figure 4A:
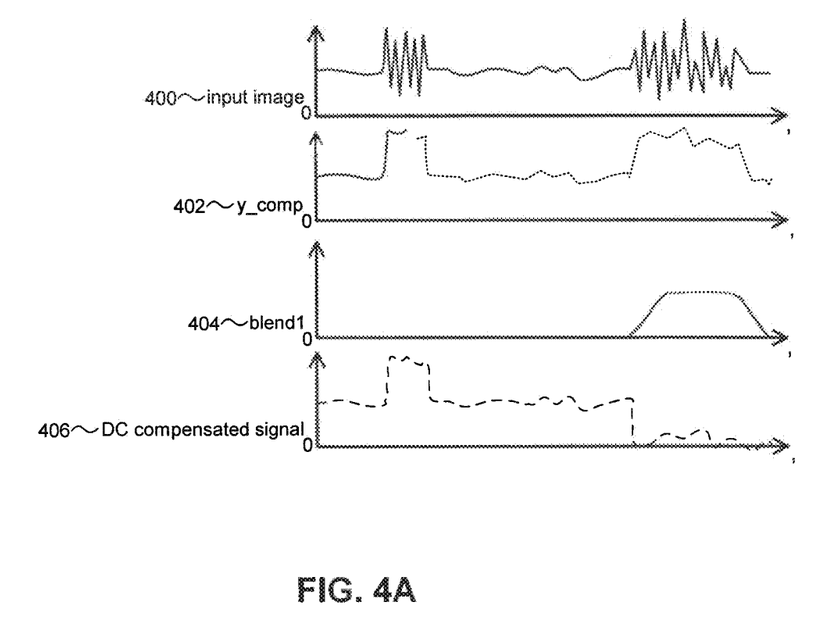
FIG. 4A is a diagram illustrating DC removal in accordance with an embodiment of the present invention.

In further detail, for each line of input, the extracted envelope profile is DC compensated by DC removal module 330 to generate an envelope compensation ("error") signal for that line. DC removal in accordance with an embodiment of the present invention will now be described with reference to FIG. 3 and with further reference to FIG. 4A. Element 400 of FIG. 4A shows line 322 of the original input image signal 302 (in the time domain), and element 402 (labeled "y_comp" in FIG. 4A) shows the envelope signal 402 passed to DC removal module 330. DC removal module 330 computes the average of envelope signal 402 at those regions where blend1 signal 310 (represented in FIG. 4A as element 404) is non-zero. DC removal module 330 then subtracts blend1 signal 310 (FIG. 4A element 404) from envelope signal 402, resulting in DC compensated signal 406.

Figure 4B:
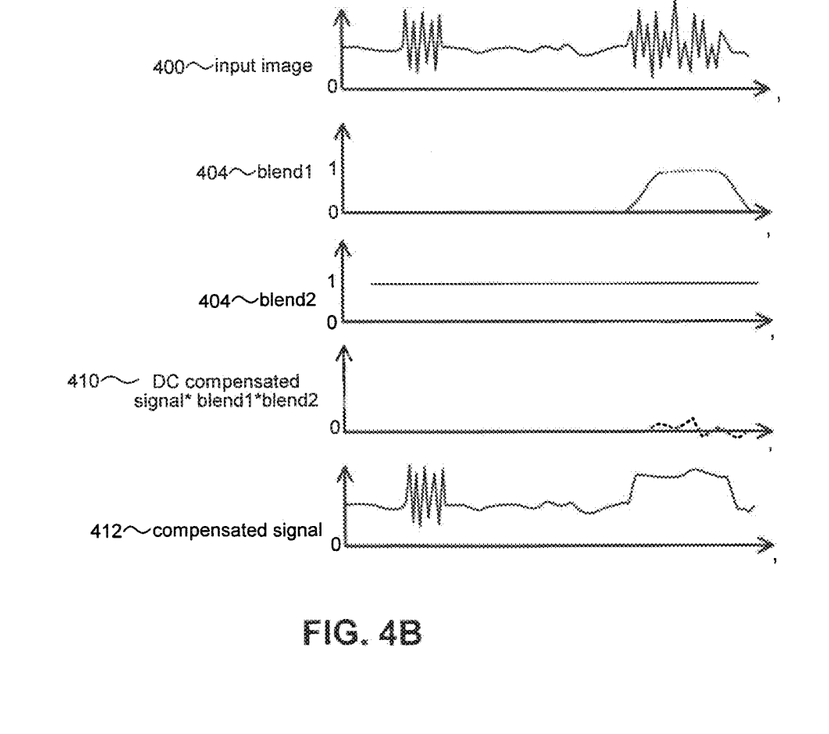
FIG. 4B is a diagram illustrating blending and envelope merging in accordance with an embodiment of the present invention.

The DC compensated signal is then merged/blended in with the original input line at the regions where envelope(s) are detected to generate compensated image 340. Blending and envelope merging in accordance with an embodiment of the present invention will now be described with reference to FIG. 3 and with further reference to FIG. 4B. Element 400 of FIG. 4B shows line 322 of the original input image signal 302 in the time domain. Element 404 of FIG. 4B shows blend1 signal 310, and element 408 of FIG. 4B shows blend2 signal 312. Error blend module 332 scales (334 and 336) the DC compensated envelope signal by blend1 signal 310 and blend2 signal 312, which results in scaled signal 410. Merge module 338 then subtracts scaled signal 410 from the co-located L input pixels 322 to yield envelope effect compensated image 340 (shown in FIG. 4B as element 412), which is then sent to display 342. In other words, blend1 signal 310 and blend2 signal 312 are used to effectively weight the DC compensated envelope signal to generate envelope effect compensated image 340. In an embodiment, DC removal module 330, error blend module 332, and/or merge module 338 may be incorporated into gamma correction module 328.

The above process is repeated for each line of input image 302 until all portions of input image 302 have been processed. After all portions of input image 302 have been processed, compensated image 340 is an envelope effect compensated version of input image 302 wherein gamma correction is effectively nullified in areas where the envelope effect exists, enabling the human eye to perceive compensated image signal 340 on display 342 without the modulated appearance of original input image 302.

3. Methods

Figure 5:
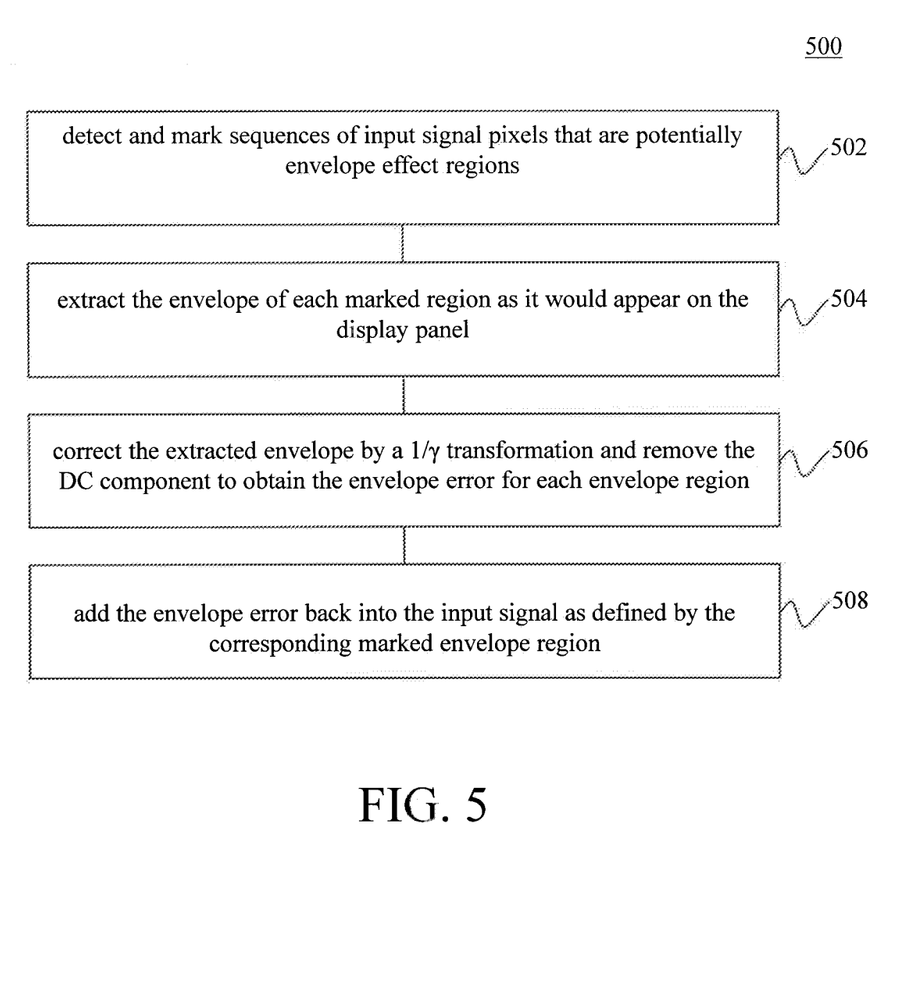
FIG. 5 is a flowchart of a method 500 for envelope effect compensation in accordance with an embodiment of the present invention.

A method 500 for envelope effect compensation in accordance with an embodiment of the present invention will now be described with reference to FIG. 5. In step 502, sequences of an input signal that are potentially envelope effect regions (i.e., portions of an input signal having a periodic luma pattern close to the Nyquist frequency) are detected and marked. In step 504, the envelope of each marked region, as it would appear on the display panel of the end user, is extracted. The display appearance of the envelope is affected by a (known or assumed) gamma correction value of the end user's display device. In step 506, the extracted envelope is corrected by a $1/\gamma$ transformation, and the DC component (i.e. average brightness) is removed to result in an envelope error signal for each image region. In step 508, the envelope error is added back to the input signal as defined by the corresponding marked envelope region to effectively nullify the effect of the end user's gamma display coefficient at near-Nyquist frequency components of the input signal.

Figure 6:
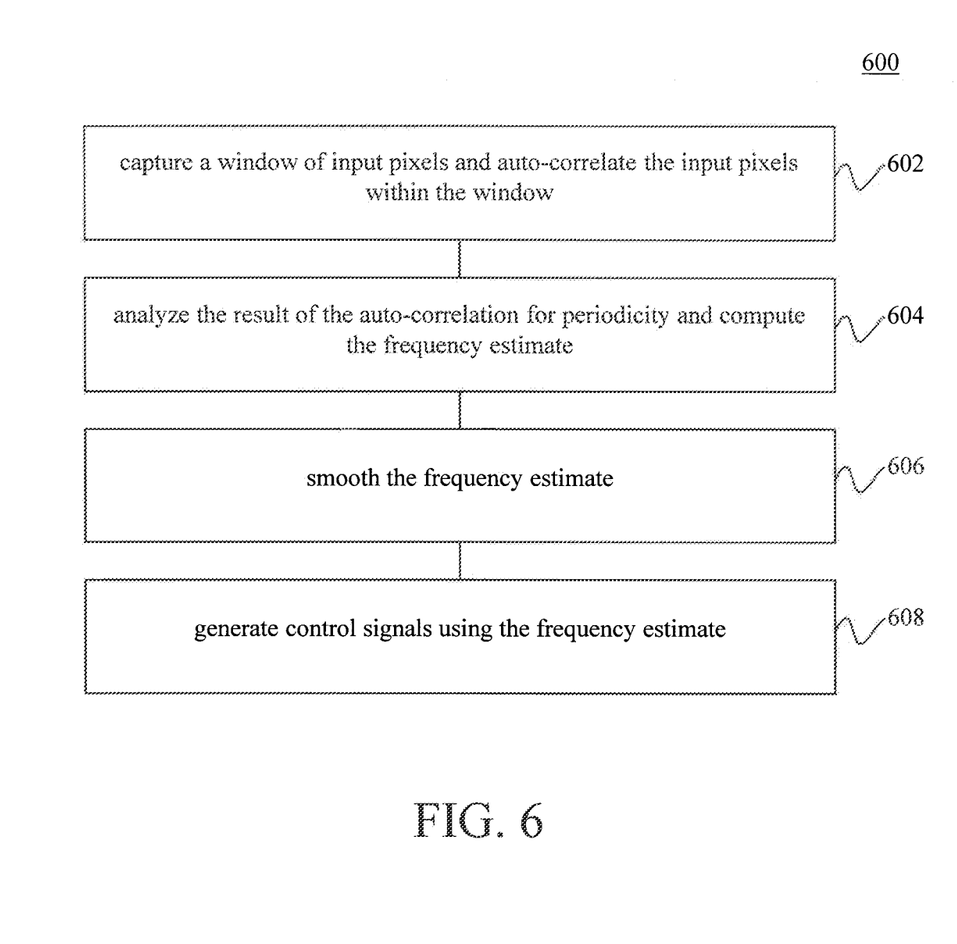
FIG. 6 is a flowchart of a method 600 of envelope detection in accordance with an embodiment of the present invention.

A method 600 of envelope detection in accordance with an embodiment of the present invention will now be described with reference to FIG. 6. In step 602, a window of input pixels is captured and the pixels within the window are auto-correlated with respect to each other. In an embodiment, the window of pixels is portion of one line of an input image, and, in an embodiment, the window shifts one pixel to the right at a time until the entire line of the input image has been processed. In step 604, the result of the auto-correlation is analyzed for periodicity. If a valid periodic signal is detected, the input frequency is estimated based, for example, on zero-crossings of the auto-correlation function. In step 606, the frequency estimate is smoothed (for example, by applying it to a 2-tap IIR filter). In step 608, control signals for envelope compensation are generated using the frequency estimate. In an embodiment two control signals for envelope compensation are generated using the frequency estimate; however, it should be noted that any number of control signals may be generated in accordance with embodiments of the present invention.

Figure 7A:
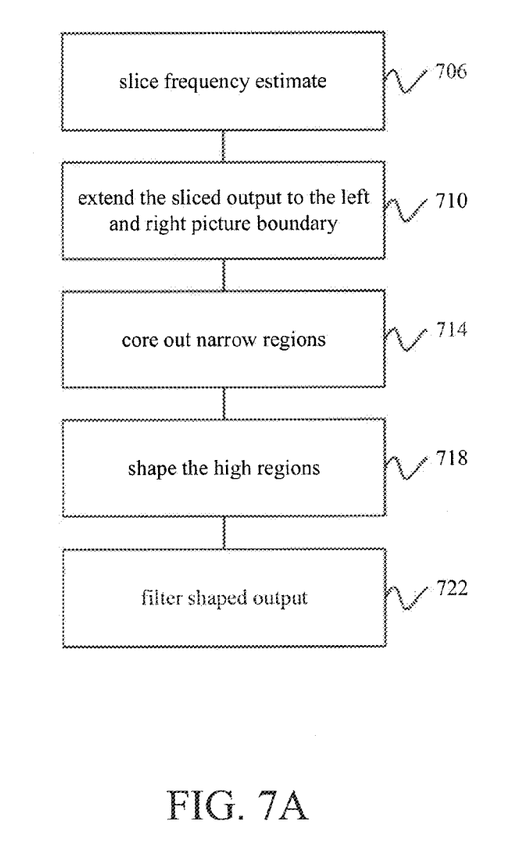
FIG. 7A is a flowchart of a method for generating a first envelope compensation control signal in accordance with an embodiment of the present invention.
Figure 7B:
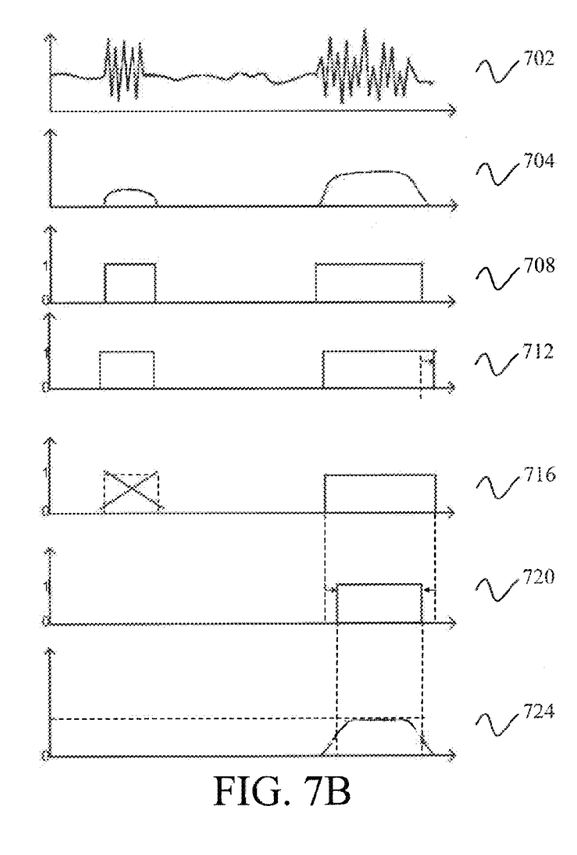
FIG. 7B is a diagram illustrating a method for generating a first envelope compensation control signal in accordance with an embodiment of the present invention.

A method for generating a first envelope compensation control signal will now be described with reference to FIGS. 7A and 7B. Element 702 of FIG. 7B shows an input image signal (in the time domain), and element 704 of FIG. 7B shows an estimate of the frequency spectrum of the input image signal. In step 706 of FIG. 7A, frequency estimate 704 is sliced to a high ("1") value or low ("0") value. Element 708 of FIG. 7B shows this sliced output. In step 710 of FIG. 7A, the sliced output is extended to the left and right picture boundary, if necessary, to avoid edge effects. This step is optional. The output of step 710 is shown in FIG. 7B as element 712. In step 714 of FIG. 7A, narrow regions of the sliced output (i.e., those regions having a width smaller than a user-defined parameter) are "cored out" (i.e., forced low). The "cored out" portion of the signal resulting from step 714 is shown in element 716 of FIG. 7B. In step 718 of FIG. 7A, the high regions of the signal are shaped (narrowed), if necessary, to avoid fringe effects. This step is optional but is especially relevant to patterns that have sharply defined or discrete frequency regions like the discrete multi burst pattern (e.g, a test pattern). The output of step 718 is shown as element 720 of FIG. 7B. In step 722 of FIG. 7A, the corresponding sliced and narrowed output is filtered (i.e., smoothed) to produce a first envelope compensation control signal (e.g., blend1 signal 310). In an embodiment, the first envelope compensation control signal may also be normalized and or clamped to a user-defined range. The output of step 722 (the first envelope compensation control signal) is shown as element 724 of FIG. 7B.

Figure 8:
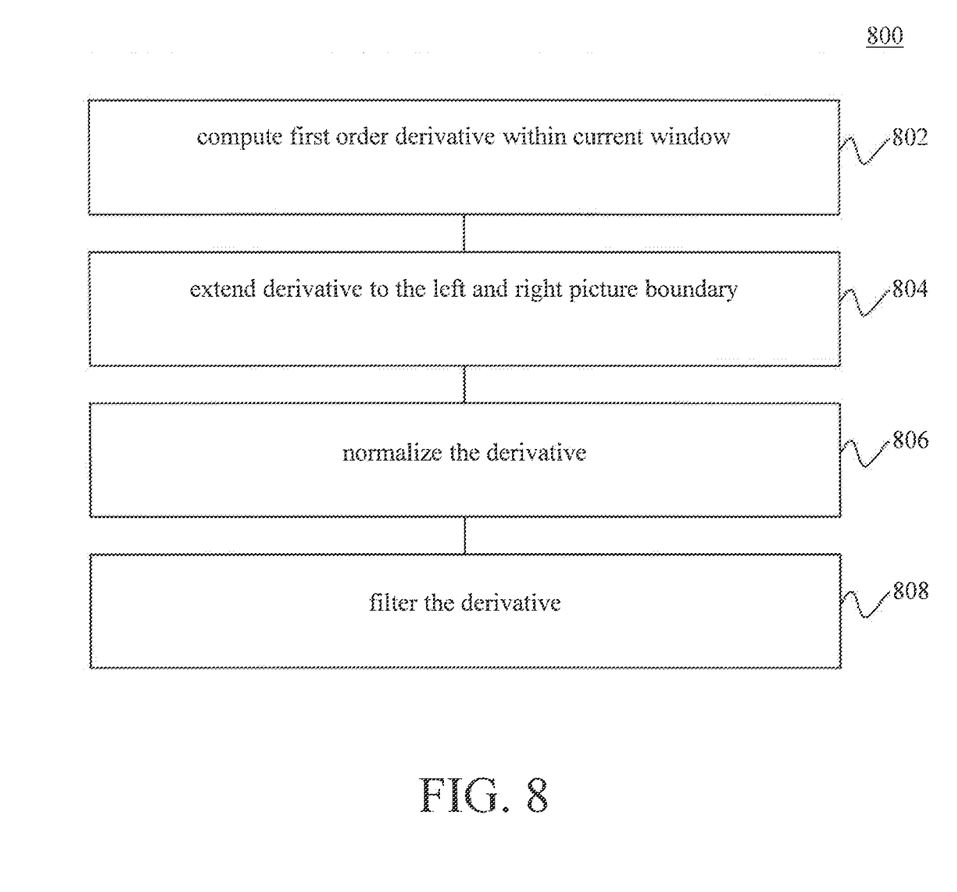
FIG. 8 is a flowchart 800 of a method for generating a second envelope compensation control signal in accordance with an embodiment of the present invention.

A method for generating a second envelope compensation control signal will now be explained with reference to FIG. 8. In step 802, the first order derivative of the auto-correlated output of an input image signal is computed using a window-based approach. For example, the first order derivative may be estimated to indicate frequency variation within the window of width "N" at location k, which may be denoted by derivative(k). The size of the window may be user programmable. In step 804, the derivative values for pixels within the first window (adjacent to the left boundary) and the last window (adjacent to the right boundary) may be optionally extended from those of the second and second last windows, respectively, to avoid edge effects. In step 806, the derivative may be optionally normalized and/or clamped to a user-programmed value. In step 808, the derivative output is filtered (smoothed) to generate a second envelope compensation control signal (e.g., blend2 signal 312).

4. Conclusion

The representative signal processing functions described herein (e.g. gamm emulation, error correction, etc.) can be implemented in hardware, software, or some combination thereof For instance, the signal processing functions can be implemented using computer processors, computer logic, application specific circuits (ASIC), digital logic, digital signal processors (DSPs), etc., as will be understood by those skilled in the arts based on the discussion given herein. Accordingly, any processor that performs the signal processing functions described herein is within the scope and spirit of the present invention.

The above systems and methods may be implemented as a computer program executing on a machine, as a computer program product, or as a tangible and/or non-transitory computer-readable medium having stored instructions.

For example, the signal processing functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
an auto-correlation module configured to determine a frequency of an input signal;
an emulation module configured to emulate a gamma value of a display device;
a first correction signal generation module configured to generate a first correction signal indicating whether a portion of the input signal is within a pre-defined range of a Nyquist frequency associated with the input signal;
a second correction signal generation module configured to generate a second correction signal indicating portions of the input signal where there is a significant change in the frequency; and
a gamma correction module configured to remove, based on the first correction signal and the second correction signal, gamma correction from the input signal.

2. The system of claim 1, wherein the gamma correction module is configured to compensate for an envelope effect in the input signal.

3. The system of claim 2, wherein the gamma correction module is configured to remove gamma correction from the input signal by nullifying the gamma correction in areas of the input signal where the envelope effect exists.

4. The system of claim 1, wherein the input signal is an image signal, and wherein the gamma correction module is further configured to remove gamma correction for frequency components of lines of the image signal that are near the Nyquist frequency.

5. The system of claim 4, wherein the image signal is a video signal to be displayed on a television screen.

6. The system of claim 1, wherein the auto-correlation module, the emulation module, and the gamma correction module are incorporated onto a display controller chip.

7. The system of claim 1, further comprising an infinite impulse response low pass filter coupled to an output of the auto-correlation module.

8. The system of claim 1, wherein the gamma correction module is coupled to an output of a finite impulse response filter.

9. The system of claim 8, wherein the finite impulse response filter is configured to monotonically decrease gain as the frequency increases, culminating with a zero at the Nyquist frequency.

10. The system of claim 1, wherein the portion of the input signal comprises one or more frequency components of the input signal within a pre-defined range of the Nyquist frequency.

11. A system for mitigating a visible envelope effect in a video signal comprising:
a video pre-processing module;
an envelope effect compensation module coupled to an output of the video pre-processing module, wherein the envelope effect compensation module includes:
an envelope compensation signal generation module, including:
a first correction signal generation module configured to generate a first correction signal indicating whether a portion of the input signal is within a pre-defined range of a Nyquist frequency associated with the input signal,
a second correction signal generation module configured to generate a second correction signal indicating portions of the input signal where there is a significant change in the frequency, and
a gamma correction module configured to remove, based on the first correction signal and the second correction signal, gamma correction from the video signal; and
a compositor coupled to an output of envelope effect compensation module, wherein the compositor is configured to transmit an output signal to a display device.

12. The system of claim 11, further comprising:
an emulation module configured to emulate a gamma value of the display device.

13. The system of claim 11, wherein the gamma correction module is configured to remove gamma correction from the input signal by nullifying the gamma correction in areas of the input signal where the visible envelope effect exists.

14. The system of claim 11, wherein the input signal is an image signal, and wherein the gamma correction module is further configured to remove gamma correction for frequency components of lines of the image signal that are near the Nyquist frequency.

15. The system of claim 14, wherein the image signal is a video signal to be displayed on a television screen.

16. A method comprising:
  detecting portions of an input signal that are likely to cause an envelope effect to be perceived at a display device;
  extracting an envelope of the detected portions of the input signal;
  determining whether a portion of the input signal is within a pre-defined range of a Nyquist frequency associated with the input signal;
  determining portions of the input signal where there is a significant change in a frequency of the input signal;
  removing gamma correction from the extracted envelope to obtain an envelope error; and
  adding the envelope error to the input signal at the detected portions of the input signal.

17. The method of claim 16, wherein
  determining whether the portion of the input signal is within the pre-defined range of the Nyquist frequency associated with the input signal comprises calculating a first envelope compensation control signal, and wherein determining portions of the input signal where there is a significant change in the frequency of the in signal comprises calculating a second envelope compensation control signal.

18. The method of claim 17, wherein the calculating the first envelope compensation control signal comprises:
  auto-correlating pixels in a first window of the input and computing a frequency estimate of the input signal based on a result of the auto-correlating.

19. The method of claim 18, wherein the calculating the second envelope compensation control signal comprises computing a derivative within a second window of the result of the auto-correlating.

20. The method of claim 16, wherein the input signal is an image signal, and wherein removing the gamma correction comprises removing the gamma correction for frequency components of lines of the image signal that are near the Nyquist frequency.

* * * * *

UNITED STATES PATENT AND TRADEMARK OFFICE
CERTIFICATE OF CORRECTION

| | | |
|---|---|---|
| PATENT NO. | : 8,462,274 B2 | Page 1 of 1 |
| APPLICATION NO. | : 13/115483 | |
| DATED | : June 11, 2013 | |
| INVENTOR(S) | : Mogre et al. | |

It is certified that error appears in the above-identified patent and that said Letters Patent is hereby corrected as shown below:

In the Claims

At column 10, line 53, please replace "of envelope" with -- of an envelope --.

At column 12, line 7, please replace "first window of the input and" with -- first window of the input signal; and --.

Signed and Sealed this
Thirty-first Day of December, 2013

Margaret A. Focarino
*Commissioner for Patents of the United States Patent and Trademark Office*